United States Patent [19]

Calundann

[11] 4,299,756
[45] Nov. 10, 1981

[54] POLYESTER OF PHENYL-4-HYDROXYBENZOIC ACID, AROMATIC DIOL, AND AROMATIC DIACID CAPABLE OF FORMING AN ANISOTROPIC MELT

[75] Inventor: Gordon W. Calundann, Somerset, N.J.

[73] Assignee: Celanese Corporation, New York, N.Y.

[21] Appl. No.: 128,759

[22] Filed: Mar. 10, 1980

[51] Int. Cl.$^3$ .............................................. C08G 63/06
[52] U.S. Cl. ................................ 260/40 R; 260/40 P; 528/173; 528/176; 528/190; 528/193; 528/194
[58] Field of Search ........................... 260/40 R, 40 P; 528/173, 176, 190, 193, 194

[56] References Cited
U.S. PATENT DOCUMENTS

| | | | |
|---|---|---|---|
| 4,067,852 | 1/1978 | Calundann | 260/40 R |
| 4,130,545 | 12/1978 | Calundann | 260/40 R |
| 4,161,470 | 7/1979 | Calundann | 260/40 R |
| 4,184,996 | 1/1980 | Calundann | 260/40 R |
| 4,219,461 | 8/1980 | Calundann | 260/40 R |

Primary Examiner—Maurice J. Welsh

[57] ABSTRACT

A novel polyester is provided which has been found to exhibit an optically anisotropic melt phase at a temperature which enables it readily to undergo melt processing to form quality fibers, films, molded articles, etc. The polyester consists essentially of substantial concentrations of 3-phenyl-4-oxybenzoyl and/or 2-phenyl-4-oxybenzoyl moieties in combination with dioxy aryl and dicarboxy aryl moieties in the proportions indicated. In a further embodiment 4-oxybenzoyl and/or 6-oxy-2-naphthoyl moieties also are included. The wholly aromatic polyester is capable of forming an anisotropic melt at a temperature below approximately 350° C., and preferably at a temperature below approximately 320° C.

46 Claims, No Drawings

POLYESTER OF PHENYL-4-HYDROXYBENZOIC ACID, AROMATIC DIOL, AND AROMATIC DIACID CAPABLE OF FORMING AN ANISOTROPIC MELT

BACKGROUND OF THE INVENTION

Wholly aromatic polyester resins long have been known. For instance, 4-hydroxybenzoic acid homopolymer and copolymers have been provided in the past and were commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldewell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems): Homopolymer for Coatings: Copolymers for Compression and Injection Molding*, by Roger S. Storm and Steven G. Cottis, Coatings Plast. Preprint, Vol. 34, No. 1, Pages 194 to 197 (April 1974). See also, U.S. Pat. Nos. 3,039,994; 3,160,121; 3,321,437; 3,549,593; 3,553,167; 3,637,595; 3,651,014; 3,723,388; 3,759,870; 3,767,621; 3,778,410; 3,787,370; 3,790,528; 3,829,406; 3,890,256; and 3,975,487. U.S. Pat. No. 3,549,593 discloses certain aromatic polyesters of hydroxybenzoic acids wherein every moiety of the polyester derived from such hydroxybenzoic acids is substituted by alkyl and/or aryl groups (a phenyl group).

Also, it more recently has been disclosed that certain polyesters may be formed which exhibit melt anisotropy. See for instance, (a) *Polyester X7G-A Self Reinforced Thermoplastic*, by W. J. Jackson Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 838,935 and 828,936, (c) Dutch Pat. No. 7505551, (d) West German Nos. 2520819, 2520820, 2722120, 2834535, 2834536 and 2834537, (e) Japanese Nos. 43-223; 2132-116; 3017-692; and 3021-293, (f) U.S. Pat. Nos. 3,991,013; 2,991,014; 4,057,597; 4,066,620; 4,067,852; 4,075,262; 4,083,829; 4,118,372; 4,130,545; 4,130,702; 4,153,779; 4,156,070; 4,159,365; 4,161,470; and 4,169,933; and (g) U.K. application No. 2,002,404. See also commonly assigned U.S. Ser. Nos. 877,917, filed Feb. 15, 1978; 10,392, filed Feb. 8, 1979 (now U.S. Pat. No. 4,238,599), and 10,393, filed Feb. 8, 1979 (now U.S. Pat. No. 4,238,598); 21,050, filed Mar. 16, 1979 (now U.S. Pat. No. 4,224,433); 32,086, filed Apr. 23, 1979 (now U.S. Pat. No. 4,219,461); and 54,049, filed July 2, 1979 (now U.S. Pat. No. 4,256,624).

In my commonly assigned U.S. Ser. No. 128,778, filed concurrently herewith, entitled "Polyester of Phenyl-4-Hydroxybenzoic Acid and 4-Hydroxybenzoic Acid and/or 6-Hydroxy-2-Napthoic Acid Capable of Forming an Anisotropic Melt" is disclosed another wholly aromatic polyester which readily undergoes melt processing.

It is an object of the present invention to provide an improved wholly aromatic polyester which particularly is suited for the formation of quality molded articles, melt extruded fibers, and melt extruded films.

It is an object of the present invention to provide an improved melt processable wholly aromatic polyester capable of forming an anisotropic melt phase at a temperature below approximately 350° C., and preferably below approximately 320° C.

It is an object of the present invention to provide an improved wholly aromatic polyester which forms a highly tractable melt phase.

It is an object of the present invention to provide an improved wholly aromatic polyester which forms an anisotropic melt phase at a temperature well below its decomposition temperature and which may form quality high performance fibers.

It is an object of the present invention to provide improved wholly aromatic polyester fibers of relatively high strength and modulus which particularly are suited for use as fibrous reinforcement in a rubber matrix.

It is another object of the present invention to provide an improved wholly aromatic polyester which readily may be melt extruded to form a film.

It is another object of the present invention to provide an improved wholly aromatic polyester which readily may be injection molded to form a molded article (which optionally may be fiber and/or filler reinforced).

These and other objects, as well as the scope, nature and utilization of the present invention will be apparent to those skilled in the art from the following detailed description.

SUMMARY OF THE INVENTION

It has been found that a melt processable wholly aromatic polyester capable of forming an anisotropic melt phase at a temperature below approximately 350° C. consisting essentially of moieties I, II, III, and IV wherein:

I is selected from the group consisting of:

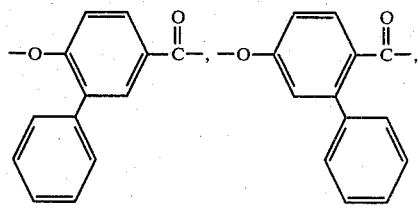

and mixtures thereof, and

II is selected from the group consisting of:

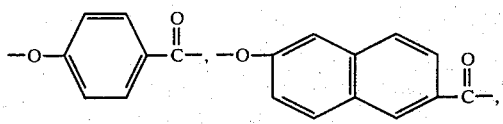

and mixtures thereof,

III is at least one dioxy aryl moiety of the formula:

where Ar' is a divalent radical comprising at least one aromatic ring, and

IV is at least one dicarboxy aryl moiety of the formula:

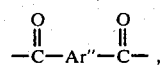

wherein Ar" is a divalent radical comprising at least one aromatic ring, and wherein at least some of the hydrogen atoms present upon the aromatic ring of moieties III and IV optionally may be replaced by substitution selected from the group consisting of an alkyl group of 1 to 4 carbon atoms, an alkoxy group of 1 to 4 carbon atoms, halogen, a phenyl group, and mixtures thereof; and wherein moiety I is present in a concentration of approximately 20 to 85 mole percent, moiety II is present in a concentration of approximately 0 to 40 mole percent, moiety III is present in a concentration of in excess of 5 up to approximately 40 mole percent, and moiety IV is present in a concentration in excess of 5 up to approximately 40 mole percent.

DESCRIPTION OF PREFERRED EMBODIMENTS

The wholly aromatic polyester of the present invention consists essentially of at least three recurring moieties which when combined in the polyester have been found to form an atypical optically anisotropic melt phase at a temperature below approximately 350° C., and preferably below approximately 320° C. In a further preferred embodiment four recurring moieties are present within the wholly aromatic polyester. The polyester commonly exhibits an anisotropic melt phase at a temperature within the range of approximately 270° to 320° C. Because of its ability to exhibit anisotropic properties (i.e., liquid crystalline properties) in the melt, the polyester readily can form a product having a highly oriented molecular structure upon melt processing. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The first essential moiety (i.e., moiety I) of the wholly aromatic polyester of the present invention is either a 3-phenyl-4-oxybenzoyl moiety or a 2-phenyl-4-oxybenzoyl moiety, or a mixture thereof. Such can be illustrated by the formulas:

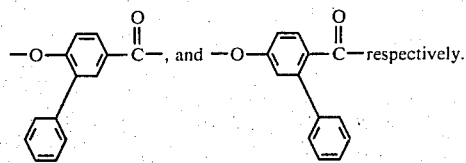

Moiety I can be derived from 3-phenyl-4-hydroxybenzoic acid and/or 2-phenyl-4-hydroxybenzoic acid and the derivatives thereof. The required starting material for moiety I can be formed by the Kolbe-Schmitt reaction whereby the appropriate phenyl substituted phenol is reacted with carbon dioxide in accordance with known techniques.

Moiety I comprises approximately 20 to 85 mole percent of the wholly aromatic polyester. In a preferred embodiment moiety I is present in a concentration of approximately 40 to 70 mole percent, and most preferably in a concentration of about 30 to 60 mole percent (e.g., approximately 60 mole percent). It has been found that if one forms a homopolymer consisting solely of a structure previously illustrated for moiety I, then the resulting polyester is largely intractable. Also, if unsubstituted 4-hydroxybenzoic acid is employed in combination with moieties III and IV to form a polyester instead of the phenyl-4-hydroxybenzoic acid, then the resulting product also tends to be largely intractable.

The second moiety (i.e., moiety II) optionally included in the wholly aromatic polyester is either a 4-oxybenzoyl moiety or a 6-oxy-2-naphthoyl moiety, or a mixture thereof. Such can be illustrated by the formulas:

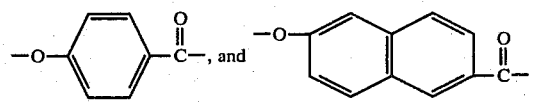

Moiety II can be derived from unsubstituted 4-hydroxybenzoic acid and/or unsubstituted 6-hydroxy-2-naphthoic acid or the derivatives thereof. 4-hydroxybenzoic acid is commercially available. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety II comprises approximately 0 to 40 mole percent of the wholly aromatic polyester. In a preferred embodiment moiety II is present in a concentration of approximately 10 to 40 mole percent (e.g., approximately 20 to 30 mole percent). In further preferred embodiments the concentration of moiety II is substantially 0. Minor concentrations (e.g., 10 mole percent or less) of other aryl hydroxyacids (e.g., 3-hydroxybenzoic acid) optionally may be included in the wholly aromatic polyester.

The next essential moiety of the wholly aromatic polyester (i.e., moiety III) is at least one dioxy aryl moiety of the formula:

where Ar' is a divalent radical comprising at least one aromatic ring. At least some of the hydrogen atoms present upon an aromatic ring optionally may be replaced by substitution selected from the group consisting of an alkyl group of 1 to 4 carbon atoms, and alkoxy group of 1 to 4 carbon atoms, halogen, a phenyl group, and mixtures thereof. Moiety III preferably is a symmetrical dioxy aryl moiety in the sense that the divalent bonds which join the moiety to other moieties in the main polymer chain are symmetrically disposed on one or more aromatic rings (e.g., are para to each other or are diagonally disposed when present on a naphthalene ring). Representative moieties which may serve as the dioxy aryl moiety in the wholly aromatic polyester of the present invention include:

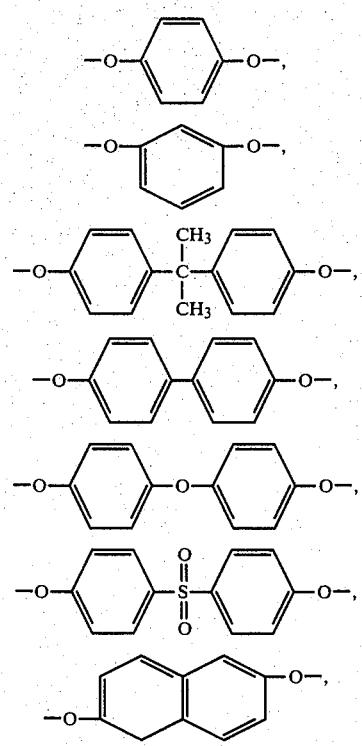

and mixtures of the foregoing.

The particularly preferred symmetrical dioxy aryl moiety is:

which may be derived from hydroquinone. Representative examples of ring substituted compounds from which moiety III can be derived include methylhydroquinone, chlorohydroquinone, bromohydroquinone, phenylhydroquinone, etc. An example of a non-symmetrical dioxy aryl moiety is that derived from resorcinol.

Moiety III comprises in excess of 5 up to approximately 40 mole percent of the wholly aromatic polyester, and preferably approximately 15 to 30 mole percent of the wholly aromatic polyester (e.g., approximately 20 mole percent).

The last essential moiety of the wholly aromatic polyester (i.e., moiety IV) is at least one dicarboxy aryl moiety of the formula:

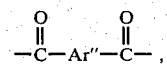

where Ar" is a divalent radical comprising at least one aromatic ring. At least some of the hydrogen atoms present upon an aromatic ring optionally may be replaced by substitution selected from the group consisting of an alkyl group of 1 to 4 carbon atoms, an alkoxy group of 1 to 4 carbon atoms, halogen, a phenyl group, and mixtures thereof. Moiety IV preferably is a symmetrical dicarboxy aryl moiety in the sense that the divalent bonds which join the moiety to other moieties in the main polymer chain are symmetrically disposed on one or more aromatic rings (i.e., are para to each other or are diagonally disposed when present on a naphthalene ring). Representative moieties which may serve as the dicarboxy aryl moiety in the wholly aromatic polyester of the present invention include:

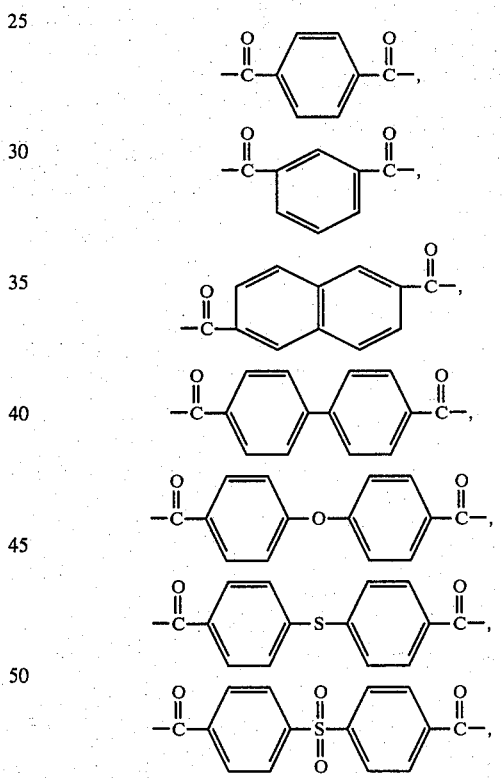

and mixtures of the foregoing.

The particularly preferred dicarboxy aryl moiety is:

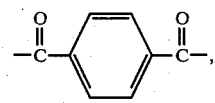

which readily may be derived from terephthalic acid.

Moiety IV comprises in excess of 5 up to approximately 40 mole percent of the wholly aromatic polyester, and preferably approximately 15 to 30 mole percent of the wholly aromatic polyester (e.g., approximately 20 mole percent). As will be apparent to those skilled in the art, the molar concentrations of moieties III and IV in the wholly aromatic polyester are substantially equal.

The wholly aromatic polyester of the present invention commonly exhibits

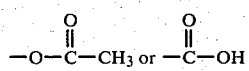

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

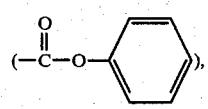

and methylester

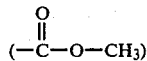

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluroisopropanol and o-chlorophenol, and accordingly are not susceptible to solution processing. They can surprisingly be readily processed by common melt processing techniques as discussed hereinafter. Most compositions are soluble to some degree in pentafluorophenol.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in pentafluorophenol solution may be employed to determine the molecular weight.

The wholly aromatic polyester prior to heat treatment additionally commonly exhibits an inherent viscosity (i.e., I.V.) of at least approximately 2.0 dl./gm. and preferably at least approximately 2.5 dl./gm. (e.g., approximately 2.5 to 5.0 dl./gm.) when dissolved in a concentration of 0.1 percent by weight in pentafluorophenol at 60° C.

The wholly aromatic polyesters of the present invention commonly may be considered crystalline in the sense that fibers melt extruded therefrom exhibit x-ray diffraction patterns using Ni-filtered Cuk α radiation and flat plate cameras characteristic of polymeric crystalline materials. Alternatively, the wholly aromatic polyester of the present invention in some instances may be considered to be amorphous in character. Also, under some circumstances crystallinity can be imparted to the same by annealing (i.e., heat treating in the solid state). In spite of the crystallinity commonly observed, the wholly aromatic polyester of the present invention nevertheless may be easily melt processed in all instances.

Unlike the aromatic polyesters commonly encountered in much of the prior art, the wholly aromatic polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizes are utilized. More specifically, the anisotropic melt phase conveniently may be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described a slurry polymerization process which may be employed to form the wholly aromatic polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I, II, and III are derived may be initially provided in a modified form whereby the usual hydroxyl groups of the monomers are esterified (i.e., they are provided as acyl esters). For instance, lower acyl esters of 3-phenyl-4-hydroxybenzoic acid, 2-phenyl-4-hydroxybenzoic acid, 4-hydroxybenzoic acid, 6-hydroxy-2-naphthoic acid, and hydroquinone (or other aromatic diol) wherein the hydroxy groups are esterified may be provided as reactants. The lower acyl groups preferably have from about 2 to about 4 carbon atoms. Preferably the acetate esters of the organic compounds which form moieties I, II, and III are provided. Accordingly, particularly preferred reactants for the condensation reaction are 3-phenyl-4-acetoxybenzoic acid, 2-phenyl-4-acetoxybenzoic acid, 4-acetoxybenzoic acid, 6-acetoxy-2-naphthoic acid, and hydroquinone diacetate.

Representative catalysts which optionally may be employed in either the melt hydrolysis procedure or in the procedure of U.S. Pat. No. 4,067,852 include dialkyl tin oxide (i.e., dibutyl tin oxide), diaryl tin oxide, titanium dioxide, alkoxy titanium silicates, titanium alkoxides, alkali and alkaline earth metal salts of carboxylic acids (e.g., sodium acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g., in a nitrogen atmosphere) at a temperature of about 260° C. for 10 to 12 hours.

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight (e.g., 10 to 35 percent by weight) of a solid filler (e.g., talc) and/or reinforcing agent (e.g., glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2,000 holes (e.g., 6 to 1,500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting point, e.g., a temperature of about 300° to 320° C. in preferred embodiments.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 10° to 20° C. below the temperature at which it melts for about 45 hours. Optimum heat treatment conditions will vary with the specific composition of the wholly aromatic polyester and with the fiber's process history.

The as-spun fibers formed from the wholly aromatic polyester of the present invention are fully oriented and exhibit highly satisfactory physical properties which render them suitable for use in high performance applications. The as-spun fibers commonly exhibit an average single filament tenacity of at least 4 grams per denier (e.g., about 4 to 12 grams per denier), and average single filament tensile modulus of at least about 300 grams per denier (e.g., about 300 to 1,000 grams per denier), and exhibit an extraordinary dimensional stability at elevated temperature (e.g., at temperatures of about 150° to 200° C.). Following thermal treatment (i.e., annealing) the fibers commonly exhibit further enhancement of the single filament tenacity and the single filament tensile modulus. Such properties enable the fibers to be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following example is presented as a specific illustration of the claimed invention. It should be understood, however, that the invention is not limited to the specific details set forth in the example.

EXAMPLE

To a 300 ml. three-neck flask fitted with an oil-sealed glass paddle stirrer, a gas inlet tube, distillation head and condenser leading to a measuring cylinder were added the following:

(a) 76.8 grams 3-phenyl-4-acetoxybenzoic acid (0.3 mole),
(b) 20.4 grams hydroquinone diacetate (0.1 mole), and
(c) 16.6 grams (5% excess) terephthalic acid (0.1 mole).

The flask was heated to 250° C. in an oil bath with stirring while a slow stream of argon passed through the system to purge air. After about 44 minutes the temperature of the oil bath was increased to 280° C. and held there for about 1 hour. It was then raised to 320° C. and held there for 68 minutes. During these periods the resulting opaque reaction melt was vigorously stirred under a constant stream of argon. By this time a total of 28 ml. of acetic acid had been collected. The viscous, opalescent reaction melt was then subjected to a reduced pressure stage (1 mm. of mercury) for about 20 min. at 320° C. The system was then vented to atmospheric pressure with argon, the stirrer was withdrawn, and the contents of the flask were left to cool under a slow steam of argon.

The flask containing the wholly aromatic polyester product was broken, the polymer plug was removed and cooled in liquid nitrogen and then ground in a mill. The resulting shredded, fibrous polymer was washed with acetone and then petroleum ether in a Soxhlet apparatus, and dried.

The inherent viscosity (I.V.) of the polymer was 2.51 dl./gm. as determined in pentafluorophenol solution of 0.1 percent by weight concentration at 60° C. in accordance with the formula $$I.V. = \frac{\ln (\eta rel)}{c}$$

and $\eta rel$ = relative viscosity. When the polymer was subjected to differential scanning calorimetry (20° C./min. heating rate), it exhibited a glass transition temperature of approximately 130° C. and showed no clearly discernable melt endotherm. The polymer melt was optically anisotropic.

The polymer was micro-melt extruded into a continuous filament through a single hole spinneret at 315° C. while employing a take-up rate of 330 meters per minute. The extruded fiber was quenched in ambient air (i.e., at 72° F. and 65 percent relative humidity).

The resulting as-spun wholly aromatic polyester fiber exhibited the following average single filament properties:

| | |
|---|---|
| Tenacity (grams per denier): | 4.17 |
| Tensile modulus (grams per denier): | 351 |
| Elongation (percent): | 1.32 |

When subjected to thermal treatment as heretofore described the above values are enhanced.

Although the invention has been described with a preferred embodiment it is to be understood that variations and modifications may be employed without departing from the concept of the invention as defined in the following claims.

I claim:
1. A melt processable wholly aromatic polyester capable of forming an anisotropic melt phase at a temperature below approximately 350° C. consisting essentially of moieties I, II, III, and IV wherein:

I is selected from the group consisting of:

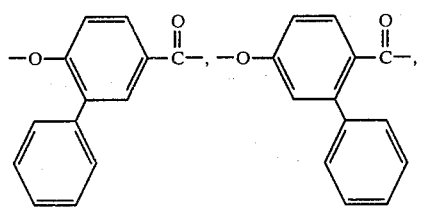

and mixtures thereof, and
II is selected from the group consisting of:

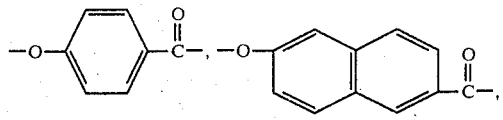

and mixtures thereof,
III is at least one dioxy aryl moiety of the formula:

where Ar' is a divalent radical comprising at least one aromatic ring, and
IV is at least one dicarboxyl aryl moiety of the formula:

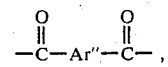

wherein Ar" is a divalent radical comprising at least one aromatic ring, and
wherein at least some of the hydrogen atoms present upon the aromatic ring of moieties III and IV optionally may be replaced by substitution selected from the group consisting of an alkyl group of 1 to 4 carbon atoms, an alkoxy group of 1 to 4 carbon atoms, halogen, a phenyl group, and mixtures thereof; and wherein moiety I is present in a concentration of approximately 20 to 85 mole percent, moiety II is present in a concentration of approximately 0 to 40 mole percent, moiety III is present in a concentration of in excess of 5 up to approximately 40 mole percent, and moiety IV is present in a concentration in excess of 5 up to approximately 40 mole percent.

2. A melt processable wholly aromatic polyester according to claim 1 which is capable of forming an anisotropic melt phase at a temperature below approximately 320° C.

3. A melt processable wholly aromatic polyester according to claim 1 which is capable of exhibiting an anisotropic melt phase at a temperature within the range of approximately 270° to 320° C.

4. A melt processable wholly aromatic polyester according to claim 1 wherein moieties III, and IV are free of ring substitution.

5. A melt processable wholly aromatic polyester according to claim 1 wherein moiety I is

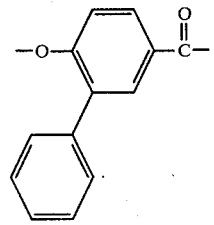

6. A melt processable wholly aromatic polyester according to claim 1 wherein moiety I is

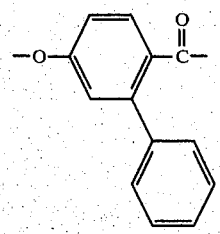

7. A melt processable wholly aromatic polyester according to claim 1 wherein moiety II is

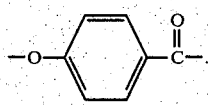

8. A melt processable wholly aromatic polyester according to claim 1 wherein moiety II is

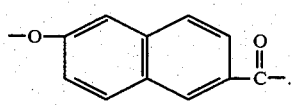

9. A melt processable wholly aromatic polyester according to claim 1 wherein said dioxy aryl moiety III is selected from the group consisting of:

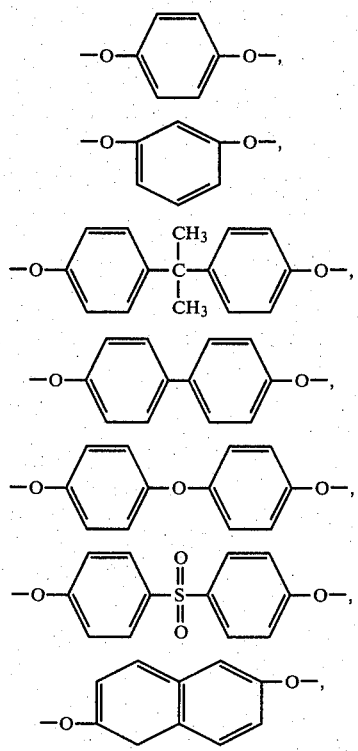

and mixtures of the foregoing.

10. A melt processable wholly aromatic polyester according to claim 1 wherein said dicarboxy aryl moiety IV is selected from the group consisting of:

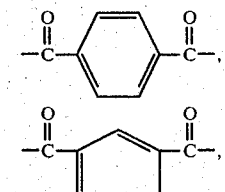

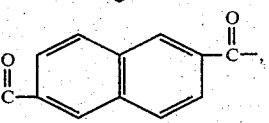

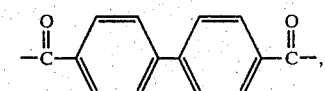

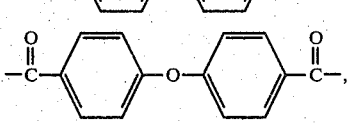

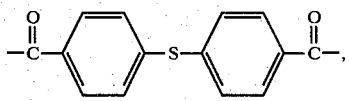

and mixtures of the foregoing.

11. A melt processable wholly aromatic polyester according to claim 1 which exhibits an inherent viscosity of at least 2.0 dl./gm. when dissolved in a concentration of 0.1 percent by weight in pentafluorophenol at 60° C.

12. A melt processable wholly aromatic polyester according to claim 1 which exhibits an inherent viscosity of at least 2.5 dl./gm. when dissolved in a concentration of 0.1 percent by weight in pentafluorophenol at 60° C.

13. A melt processable wholly aromatic polyester according to claim 1 wherein the molar concentration of moiety II is substantially 0.

14. A melt processable wholly aromatic polyester according to claim 1 which consists essentially of approximately 40 to 70 mole percent of moiety I, approximately 0 mole percent of moiety II, approximately 15 to 30 mole percent of moiety III, and approximately 15 to 30 mole percent of moiety IV, with the proviso that the molar concentrations of moieties III and IV are substantially equal.

15. A melt processable wholly aromatic polyester according to claim 1 which consists essentially of approximately 30 to 60 mole percent of moiety I, approximately 10 to 40 mole percent of moiety II, approximately 15 to 25 mole percent of moiety III, and approximately 15 to 25 mole percent of moiety IV.

16. A fiber which has been melt spun from the wholly aromatic polyester of claim 1.

17. A film which has been melt extruded from the wholly aromatic polyester of claim 1.

18. A molded article comprising the melt processable wholly aromatic polyester of claim 1.

19. A molding compound comprising the melt processable wholly aromatic polyester of claim 1 containing approximately 1 to 60 percent by weight of a solid filler and/or reinforcing agent.

20. A molding compound comprising the melt processable wholly aromatic polyester of claim 1 containing approximately 10 to 35 percent by weight of a solid filler and/or reinforcing agent.

21. A melt processable wholly aromatic polyester capable of forming an anisotropic melt phase at a temperature below approximately 350° C. consisting essentially of moieties I, III, and IV wherein:

I is

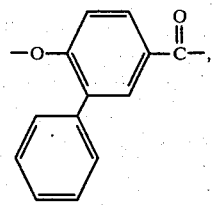

III is at least one dioxy aryl moiety of the formula:

—O—Ar'—O—, where Ar' is a divalent radical comprising at least one aromatic ring, and IV is at least one dicarboxy aryl moiety of the formula:

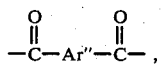

wherein Ar'' is a divalent radical comprising at least one aromatic ring, and wherein at least some of the hydrogen atoms present upon the aromatic ring of moieties III and IV optionally may be replaced by substitution selected from the group consisting of an alkyl group of 1 to 4 carbon atoms, an alkoxy group of 1 to 4 carbon atoms, halogen, a phenyl group, and mixtures thereof; and wherein moiety I is present in a concentration of approximately 40 to 70 mole percent, moiety III is present in a concentration of approximately 15 to 30 mole percent, and moiety IV is present in a concentration of approximately 15 to 30 mole percent, with the proviso that the molar concentrations of moieties III and IV are substantially equal.

22. A melt processable wholly aromatic polyester according to claim 21 which is capable of forming an anisotropic melt phase at a temperature below approximately 320° C.

23. A melt processable wholly aromatic polyester according to claim 21 which is capable of exhibiting an anisotropic melt phase at a temperature within the range of approximately 270° to 320° C.

24. A melt processable wholly aromatic polyester according to claim 21 wherein moieties III and IV are free of ring substitution.

25. A melt processable wholly aromatic polyester according to claim 21 wherein said dioxy aryl moiety III is selected from the group consisting of:

-continued

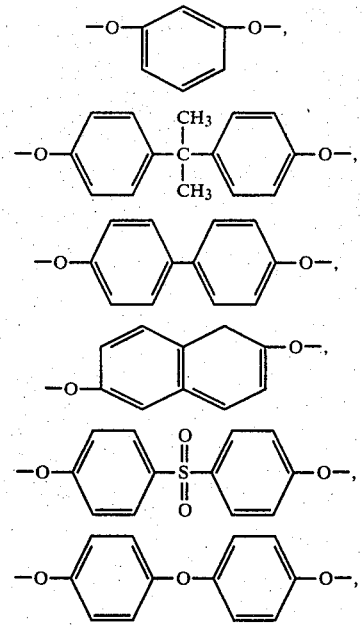

and mixtures of the foregoing.

26. A melt processable wholly aromatic polyester according to claim 21 wherein said dicarboxy aryl moiety IV is selected from the group consisting of:

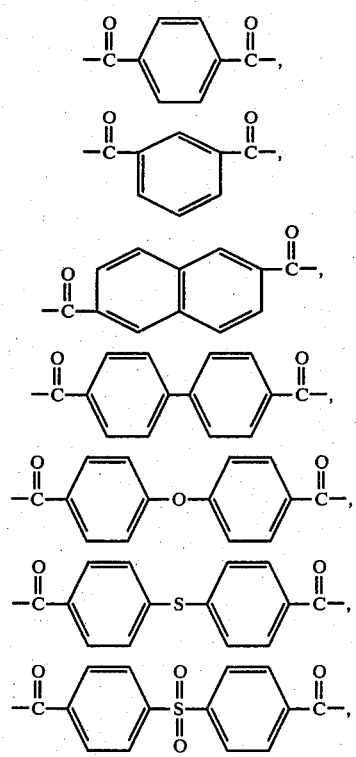

and mixtures of the foregoing.

27. A melt processable wholly aromatic polyester according to claim 21 which exhibits an inherent viscosity of at least 2.0 dl./gm. when dissolved in a concentration of 0.1 percent by weight in pentafluorophenol at 60° C.

28. A melt processable wholly aromatic polyester according to claim 21 which exhibits an inherent viscosity of at least 2.5 dl./gm. when dissolved in a concentration of 0.1 percent by weight in pentafluorophenol at 60° C.

29. A melt processable wholly aromatic polyester according to claim 21 which consists essentially of approximately 50 to 60 mole percent of moiety I, approximately 20 to 25 mole percent of moiety III, and approximately 20 to 25 mole percent of moiety IV.

30. A fiber which has been melt spun from the wholly aromatic polyester of claim 20.

31. A film which has been melt extruded from the wholly aromatic polyester of claim 20.

32. A molded article comprising the melt processable wholly aromatic polyester of claim 20.

33. A molding compound comprising the melt processable wholly aromatic polyester of claim 20 containing approximately 1 to 60 percent by weight of a solid filler and/or reinforcing agent.

34. A molding compound comprising the melt processable wholly aromatic polyester of claim 20 containing approximately 10 to 35 percent by weight of a solid filler and/or reinforcing agent.

35. A melt processable wholly aromatic polyester capable of forming an anisotropic melt phase at a temperature below approximately 350° C. consisting essentially of moieties I, III, and IV wherein:

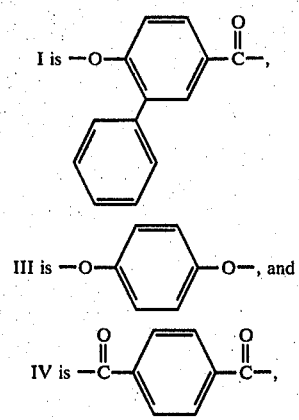

wherein at least some of the hydrogen atoms present upon the aromatic ring of moieties III and IV optionally may be replaced by substitution selected from the group consisting of an alkyl group of 1 to 4 carbon atoms, an alkoxy group of 1 to 4 carbon atoms, halogen, a phenyl group, and mixtures thereof; and wherein moiety I is present in a concentration of approximately 40 to 70 mole percent, moiety III is present in a concentration of approximately 15 to 30 mole percent, and moiety IV is present in a concentration of approximately 15 to 30 mole percent, with the proviso that the molar concentrations of moieties III and IV are substantially equal.

36. A melt processable wholly aromatic polyester according to claim 35 which is capable of forming an anisotropic melt phase at a temperature below approximately 320° C.

37. A melt processable wholly aromatic polyester according to claim 35 which is capable of exhibiting an anisotropic melt phase at a temperature within the range of approximately 270° to 320° C.

38. A melt processable wholly aromatic polyester according to claim 35 wherein moieties III and IV are free of ring substitution.

39. A melt processable wholly aromatic polyester according to claim 35 which exhibits an inherent viscosity of at least 2.0 dl./gm. when dissolved in a concentration of 0.1 percent by weight of pentafluorophenol at 60° C.

40. A melt processable wholly aromatic polyester according to claim 35 which exhibits an inherent viscosity of at least 2.5 dl./gm. when dissolved in a concentration of 0.1 percent by weight in pentafluorophenol at 60° C.

41. A melt processable wholly aromatic polyester according to claim 35 which consists essentially of approximately 50 to 60 mole percent of moiety I, approximately 20 to 25 mole percent of moiety III, and approximately 20 to 25 mole percent of moiety IV.

42. A fiber which has been melt spun from the wholly aromatic polyester of claim 35.

43. A film which has been melt extruded from the wholly aromatic polyester of claim 35.

44. A molded article comprising the melt processable wholly aromatic polyester of claim 35.

45. A molding compound comprising the melt processable wholly aromatic polyester of claim 35 containing approximately 1 to 60 percent by weight of a solid filler and/or reinforcing agent.

46. A molding compound comprising the melt processable wholly aromatic polyester of claim 35 containing approximately 10 to 35 percent by weight of a solid filler and/or reinforcing agent.

* * * * *